No. 889,017. PATENTED MAY 26, 1908.
S. L. JOHNSON.
CUTTER FOR SHEEP SHEARING.
APPLICATION FILED JULY 3, 1907.
2 SHEETS—SHEET 1.
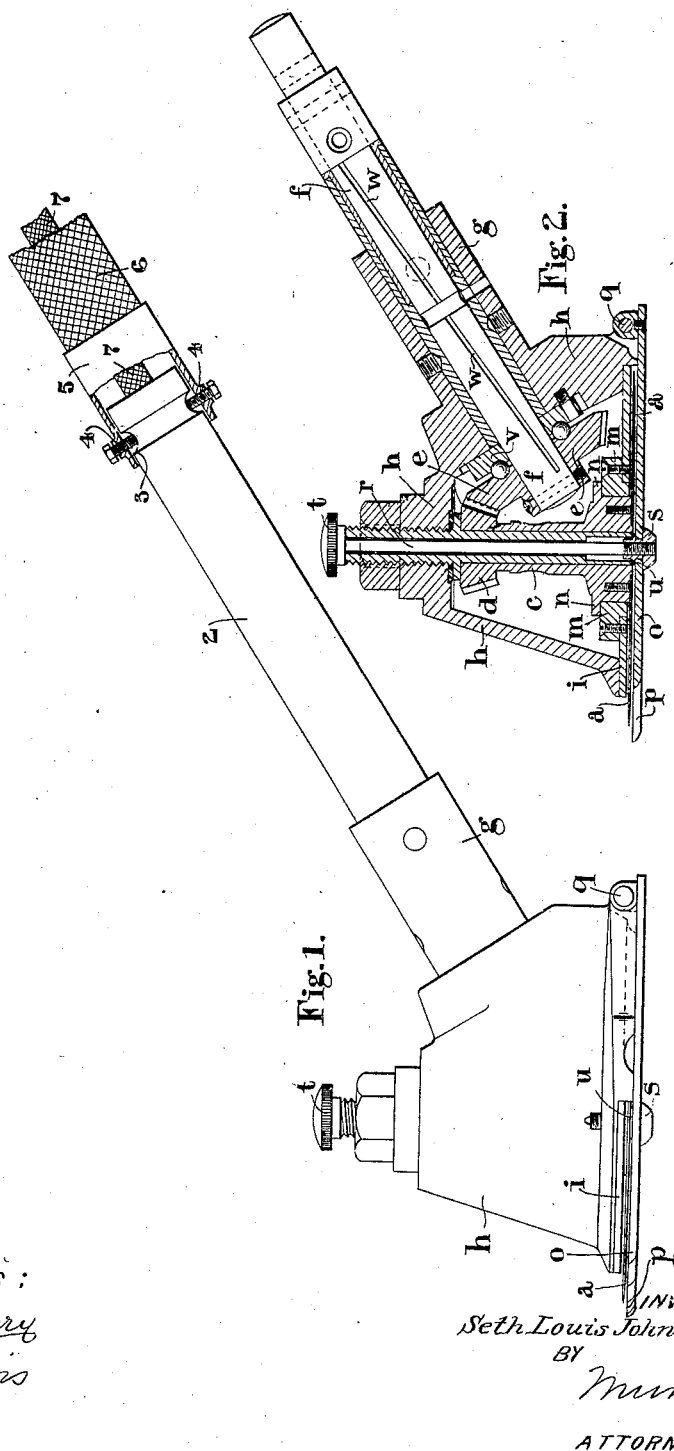
WITNESSES:
W. M. Avery
J. P. Davis
INVENTOR
Seth Louis Johnson
BY
Munn & Co
ATTORNEYS No. 889,017. PATENTED MAY 26, 1908.
S. L. JOHNSON.
CUTTER FOR SHEEP SHEARING.
APPLICATION FILED JULY 3, 1907.
2 SHEETS—SHEET 2.
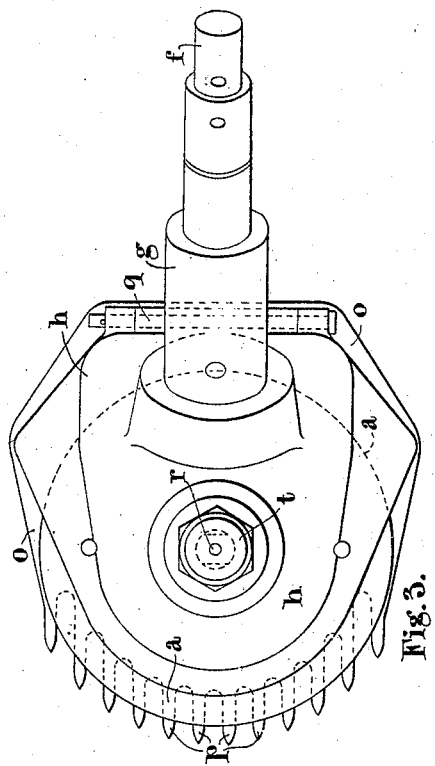
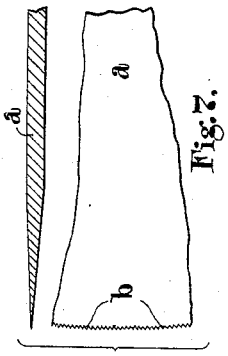
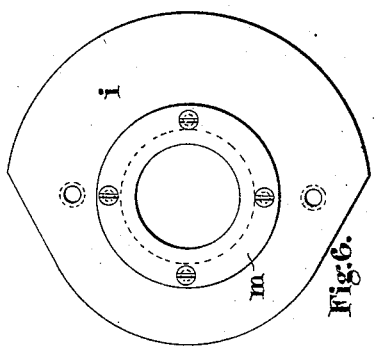
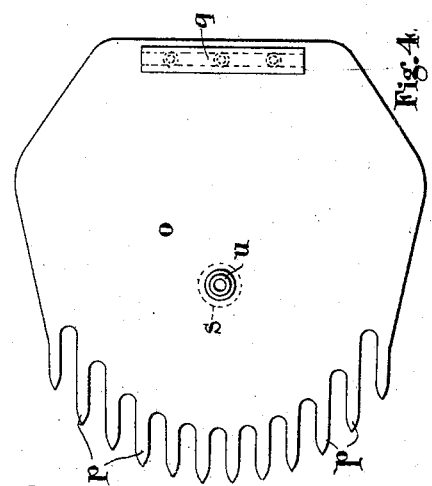
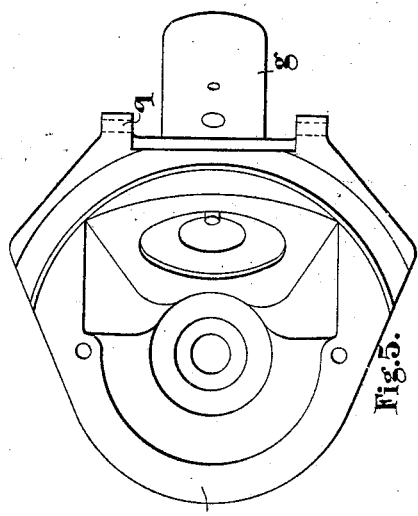
WITNESSES:
W. M. Avery
J. P. Davis
INVENTOR
Seth Louis Johnson
BY
Munn & Co
ATTORNEYS

UNITED STATES PATENT OFFICE.

SETH LOUIS JOHNSON, OF BRADFORD, ENGLAND, ASSIGNOR TO THE YORKSHIRE WOOL & LEATHER CO., LIMITED, OF BRADFORD, ENGLAND.

CUTTER FOR SHEEP-SHEARING.

No. 889,017.  Specification of Letters Patent.  Patented May 26, 1908.

Application filed July 3, 1907. Serial No. 382,057.

*To all whom it may concern:*

Be it known that I, SETH LOUIS JOHNSON, a subject of the King of Great Britain and Ireland, and residing at Holmbank Lodge, Tyersal, Bradford, in the county of York, England, have invented certain new and useful Improvements in Connection with Cutters for Sheep-Shearing, of which the following is a specification.

This invention relates to improvements in connection with apparatus for cutting wool and the like, and has reference to the manner in which I arrange a rotary disk or serrated cutting member for removing wool from the skin of a sheep or other animal whether alive or dead the object being to provide an apparatus that will effectually remove or cut off the wool without injuring or cutting into the skin, and to enable such apparatus to be actuated by hand, mechanical or electrical appliances, as may be desired for the particular positions in which such have to work, and also for obviating the necessity for using an underneath or lower cutting member in combination with the rotary cutter.

According to the present invention we employ a rotary cutting disk the periphery of which is tapered to a sharp edge and such edge is slightly roughened by forming thereon a number of very finely divided serrations or minute teeth. Said roughening may be obtained in one convenient manner by lightly rubbing over the smooth sharp edge with a fine file or like tool. We also arrange in conjunction with the said cutting disk a shield or guard adapted to collect and comb up the wool so that it may be directed against the edge of the rotary disk and also to prevent the disk from getting into direct contact with the skin of the animal being operated upon.

Referring now to the accompanying drawings, which illustrate one convenient form of apparatus constructed according to the invention, and forming part of this specification.

Figure 1 is a side elevation, Fig. 2 a side sectional elevation, and Fig. 3 a plan, Fig. 4 is a plan of the guard plate, Fig. 5 a reverse plan of the main casing, other parts being omitted, Fig. 6 a plan of the base plate for supporting the gearing, and Fig. 7 a detail enlarged sectional elevation and plan of a portion of the rotary cutting disk.

The rotary disk, $a$, which is tapered to a sharp edge and is formed with a number of minute or finely divided serrations, $b$, is attached to a sleeve, $c$, and rotated by means of bevel wheels, $d$ and $e$, the former of which is integral with or fixed to the sleeve, $c$, and the latter of which is fixed to the inclined spindle, $f$. This spindle preferably passes through a sleeve, $g$, adapted to form a handle or holder, and to the outer end of the spindle we connect a flexible shaft or other universal coupling which is set in motion by an electric motor or other mechanical power transmitting device.

The gearing is inclosed within a cap or casing, $h$, to the lower end of which is attached a base plate, $i$, and upon this base-plate is mounted a ring or annular member, $m$, forming a bearing surface for the flanged portion, $n$, of the sleeve, $c$.

Beneath the rotary disk, $a$, we mount a shield or guard plate, $o$, the front portion of which is formed with fingers, $p$, projecting beyond the periphery of the disk, $a$, as clearly shown in Fig. 3. These fingers serve to collect and comb up the wool in such a manner that it may be directed on to the edge of the disk for removal.

Any desired form of attachment may be employed for the guard plate, $o$, but preferably it is hinged at $q$, to the casing, $h$, and is held in its operative position, slightly spaced from the rotary disk, $a$, by means of a rod, $r$, passing through the sleeve, $c$. This rod is provided with a tightening nut, $s$, at its lower end and a head, $t$, at its upper end, a spacing member, $u$, being employed for keeping the guard plate at any suitable distance from the rotary disk. The under faces of the projecting finger pieces, $p$, on the guard plate are preferably curved upwardly at their outer extremities in order to lift the wool from the skin of the animal being treated and such fingers effectively prevent the rotary disk from getting into contact with the skin.

A further feature of our improved apparatus, and which is illustrated partly in section in Fig. 1, relates to means for preventing the flexible power shaft from being strained or broken in the event of any wool catching in and clogging, the cutter. The handle, 2, by which the cutter and its casing is manipulated, is provided at its outer end with a groove, 3, adapted to be engaged by the screws 4 on the cup, 5. This cup is arranged at the end of the non-rotatable flexible covering, 6, of the flexible shaft, 7, which passes through the handle, 2, and cover, 6, and is suitably connected at its ends to the power shaft and cutter driving spindle respectively. Should any wool clog and prevent the cutter from rotating relatively to the casing, this arrangement will allow of the whole apparatus rotating relatively to the stationary cover, 6, until the motor or the like can be stopped, the wool then being removed.

We preferably arrange ball or other anti-friction bearings for the parts rotating within the cap or casing, $h$. Such a bearing is shown for example in Fig. 2 between the bevel wheel, $e$, and its bearing ring, $v$, and one is preferably also provided between the sleeve, $c$, and its bearing ring, $m$.

It will be seen from the construction of the apparatus that the bevel or like gearing is quite inclosed by the casing, $h$, and base plate, $i$, and may therefore be filled to any desired extent with a suitable lubricant, a groove or grooves, $w$, being also provided for lubricating the spindle, $f$.

We do not limit the application of our invention to any particular means for transmitting motion to our rotary cutting wheel.

Having thus described my invention what I claim as new and desire to secure by Letters Patent is:—

1. In apparatus for removing wool, hair or the like from the skins of animals, the combination of a rotary cutting disk, having minute serrations upon its periphery, a casing arranged above said cutting disk, means mounted within said casing for rotating said disk, a guard plate hinged to the casing, and means for securing said guard plate in operative position.

2. In apparatus for removing wool, hair or the like from the skins of animals, the combination of a rotary cutting disk having a number of finely divided serrations upon its periphery, a casing arranged above said cutting disk, a rotatable sleeve mounted within said casing, means for securing the disk to said sleeve, a guard plate hinged to the casing and means, passing through said sleeve to the top of the casing, for securing said guard plate in operative position.

3. In apparatus for removing wool, hair or the like from the skins of animals, the combination of a rotary cutting disk having a number of finely divided serrations upon its periphery, a guard plate therefor, a casing arranged above said cutting disk, means in said casing, for rotating the disk, a flexible shaft connected to said rotating means, a non-rotatable covering for said flexible shaft, and means for allowing of the rotation of the casing with the flexible shaft independently of the non-rotatable covering.

4. In apparatus for removing wool, hair or the like from the skins of animals, the combination of a rotary cutting disk having a number of finely divided serrations upon its periphery, a guard plate therefor, a casing arranged above said cutting disk, means in said casing for rotating the disk, a flexible shaft connected to said rotating means, a hollow manipulating handle secured to the casing, a non-rotatable covering for said flexible shaft extending from the handle to a power shaft, a groove on said handle, and projections on the non-rotatable covering engaging said groove.

5. In apparatus for removing wool hair or the like from the skins of animals, the combination of a rotary cutting disk having a number of finely divided serrations upon its periphery, an inclosed casing arranged above said disk, a guard plate hinged to said casing and having fingers projecting beyond the periphery of the disk, a rotatable sleeve in said casing carrying the disk, a bolt for supporting the guard plate and passing through said sleeve, and bevel gearing inclosed in said casing for rotating the sleeve.

In testimony whereof I have signed my name to this specification in the presence of two subscribing witnesses.

SETH LOUIS JOHNSON.

Witnesses:
  FRED HAMMOND,
  W. E. CALVERT.